(12) United States Patent
Kruse et al.

(10) Patent No.: US 8,058,552 B2
(45) Date of Patent: Nov. 15, 2011

(54) ELECTRICAL WIRING SYSTEM

(75) Inventors: Russell E. Kruse, St. Charles, MO (US); Russell L. Bryant, Vernon Hills, IL (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 12/790,235

(22) Filed: May 28, 2010

(65) Prior Publication Data

US 2010/0240249 A1      Sep. 23, 2010

Related U.S. Application Data

(60) Continuation of application No. 11/385,346, filed on Mar. 20, 2006, now Pat. No. 7,754,967, which is a continuation of application No. 10/913,084, filed on Aug. 6, 2004, now abandoned, which is a division of application No. 10/141,695, filed on May 7, 2002, now Pat. No. 6,774,307.

(51) Int. Cl.
*H01H 9/02* (2006.01)
*H02G 3/08* (2006.01)

(52) U.S. Cl. ............. 174/53; 174/481; 174/50; 174/58; 220/3.2; 220/3.3; 439/535

(58) Field of Classification Search ............ 174/53, 174/480, 481, 50, 57, 58, 59, 61; 220/3.2–3.9, 220/4.02, 241, 242, 3.94; 439/535, 949, 439/928
See application file for complete search history.

(56) References Cited

U.S. PATENT DOCUMENTS

| | | | |
|---|---|---|---|
| 1,938,309 A * | 12/1933 | Williams | .................. 174/55 |
| 1,938,917 A | 12/1933 | Loetscher | |
| 2,238,386 A | 4/1941 | Frank | |
| 2,297,862 A | 10/1942 | Bachmann | |
| 2,397,688 A | 4/1946 | Osinski | |
| 2,399,688 A | 5/1946 | Metzner et al. | |
| 2,433,917 A * | 1/1948 | McCartney | .................. 174/53 |
| 2,466,930 A | 4/1949 | Cook | |
| 2,515,256 A | 7/1950 | O'Brien et al. | |
| 2,644,144 A | 6/1953 | Richardson | |
| 2,763,847 A | 9/1956 | Hubbell | |

(Continued)

FOREIGN PATENT DOCUMENTS

JP          60-14026          1/1994

(Continued)

OTHER PUBLICATIONS

U.S. Reexamination Proceeding U.S. Appl. No. 95/000,200—Right of Appeal Notice.

(Continued)

*Primary Examiner* — Angel R Estrada

(57) ABSTRACT

An electrical wiring system for use in an AC electrical power distribution circuit including a plurality of AC electric power transmitting wires having termination ends disposed within a device box. The system includes a plug connector device configured to terminate the plurality of AC electric power transmitting wires. The system additionally includes an electrical wiring device including at least one AC electric circuit element and at least one electrical interface operatively coupled to the at least one circuit element. The electrical wiring device also includes a receptacle, wherein the receptacle is configured to receive the plug connector device such that electrical continuity is established between the AC electric circuit element and the plurality of AC electric power transmitting wires when the plug connector device is inserted into the receptacle.

17 Claims, 4 Drawing Sheets

U.S. PATENT DOCUMENTS

| | | | |
|---|---|---|---|
| 2,875,915 A | 3/1959 | Buckels | |
| 2,892,174 A | 6/1959 | Benander | |
| 2,937,688 A | 5/1960 | Kirchner | |
| 2,941,178 A | 6/1960 | Hubbell | |
| 2,969,518 A | 1/1961 | Slater | |
| 2,985,334 A | 5/1961 | Slater | |
| 3,002,175 A | 9/1961 | Bertram et al. | |
| 3,023,394 A | 2/1962 | Hubbell | |
| 3,038,141 A | 6/1962 | Chiuchiolo | |
| 3,120,987 A | 2/1964 | Degnan | |
| 3,121,599 A | 2/1964 | Modrey | |
| 3,156,761 A | 11/1964 | Schinske | |
| 3,233,204 A | 2/1966 | Vore | |
| 3,390,404 A | 6/1968 | Murchison | |
| 3,500,291 A | 3/1970 | Hubbell | |
| 3,510,822 A | 5/1970 | Patterson | |
| 3,551,880 A | 12/1970 | Hartwell | |
| 3,609,647 A * | 9/1971 | Castellano | 439/535 |
| 3,622,029 A | 11/1971 | Ware | |
| 3,641,472 A | 2/1972 | Phillips, Jr. | |
| 3,685,007 A | 8/1972 | Riley et al. | |
| 3,699,499 A | 10/1972 | Spaderna | |
| 3,707,697 A | 12/1972 | Izumi | |
| 3,716,651 A | 2/1973 | Werner | |
| 3,723,948 A | 3/1973 | Wyatt | |
| 3,781,769 A | 12/1973 | Wiley | |
| 3,814,834 A | 6/1974 | Glader | |
| 3,852,513 A | 12/1974 | Flahive | |
| 3,858,161 A | 12/1974 | Champion et al. | |
| 3,868,161 A | 2/1975 | Frantz | |
| 3,879,101 A * | 4/1975 | McKissic | 439/535 |
| 3,879,109 A | 4/1975 | Thomas | |
| 3,945,702 A | 3/1976 | Pollak et al. | |
| 3,957,336 A | 5/1976 | Bromberg | |
| 3,975,074 A | 8/1976 | Fuller | |
| 3,999,829 A | 12/1976 | Glaesel | |
| 4,039,235 A | 8/1977 | Thibeault | |
| 4,075,758 A | 2/1978 | Parson | |
| 4,125,767 A | 11/1978 | Silver | |
| 4,165,443 A | 8/1979 | Figart et al. | |
| 4,166,934 A | 9/1979 | Marrero | |
| 4,203,638 A | 5/1980 | Tansi | |
| 4,213,667 A | 7/1980 | Wittes | |
| 4,243,957 A | 1/1981 | Schmidt | |
| 4,245,880 A | 1/1981 | Zimmerman et al. | |
| 4,255,007 A | 3/1981 | Michaels et al. | |
| 4,273,957 A * | 6/1981 | Kolling, Jr. | 439/535 |
| 4,289,921 A | 9/1981 | Gartner et al. | |
| 4,295,018 A | 10/1981 | Borrelli | |
| 4,336,418 A | 6/1982 | Hoag | |
| 4,386,820 A | 6/1983 | Dola et al. | |
| 4,399,371 A | 8/1983 | Ziff et al. | |
| 4,439,813 A | 3/1984 | Dougherty et al. | |
| 4,443,654 A | 4/1984 | Flachbarth et al. | |
| 4,477,141 A | 10/1984 | Hardesty | |
| 4,479,692 A | 10/1984 | Greenwood et al. | |
| 4,504,103 A | 3/1985 | Woedl | |
| 4,520,306 A | 5/1985 | Kirby | |
| 4,531,798 A | 7/1985 | Baur et al. | |
| 4,545,632 A | 10/1985 | Maier et al. | |
| 4,550,967 A | 11/1985 | Riches et al. | |
| 4,553,000 A | 11/1985 | Appleton | |
| 4,555,418 A | 11/1985 | Snider | |
| 4,589,719 A | 5/1986 | Gentry et al. | |
| 4,606,595 A | 8/1986 | Dola | |
| 4,627,675 A | 12/1986 | Taylor et al. | |
| 4,657,334 A | 4/1987 | Simmons | |
| 4,669,804 A | 6/1987 | Munroe | |
| 4,699,804 A | 10/1987 | Miyata | |
| 4,725,249 A * | 2/1988 | Blackwood et al. | 439/535 |
| 4,759,726 A | 7/1988 | Naylor | |
| 4,780,089 A | 10/1988 | Wernick | |
| 4,842,551 A * | 6/1989 | Heimann | 174/58 |
| 4,854,885 A | 8/1989 | Bowden | |
| 4,875,871 A | 10/1989 | Booty | |
| 4,917,625 A | 4/1990 | Haile | |
| 4,918,258 A | 4/1990 | Ayer | |
| 4,960,388 A | 10/1990 | Frantz et al. | |
| 5,015,203 A * | 5/1991 | Furrow | 439/535 |
| 5,043,531 A | 8/1991 | Gutenson et al. | |
| 5,046,961 A | 9/1991 | Hoffman | |
| 5,057,646 A | 10/1991 | Nichols et al. | |
| 5,092,787 A | 3/1992 | Wise et al. | |
| 5,108,313 A | 4/1992 | Adams | |
| 5,117,122 A | 5/1992 | Hogarth et al. | |
| D329,422 S | 9/1992 | Fujiyoshi | |
| 5,160,808 A | 11/1992 | Hadfield | |
| 5,162,611 A | 11/1992 | Nichols, III et al. | |
| 5,167,542 A | 12/1992 | Haitmanek | |
| 5,178,555 A | 1/1993 | Kilpatrick et al. | |
| 5,185,580 A | 2/1993 | Nichols, III et al. | |
| 5,190,468 A | 3/1993 | Nichols, III et al. | |
| 5,234,355 A | 8/1993 | Sosinski et al. | |
| D340,913 S | 11/1993 | Miller | |
| D341,125 S | 11/1993 | Miller | |
| 5,297,973 A | 3/1994 | Gorman | |
| 5,328,387 A | 7/1994 | Hoffman | |
| 5,352,122 A | 10/1994 | Speyer et al. | |
| 5,397,806 A | 3/1995 | Soled et al. | |
| 5,397,929 A | 3/1995 | Hogarth et al. | |
| 5,399,806 A | 3/1995 | Olson | |
| 5,423,695 A | 6/1995 | Robinson et al. | |
| 5,472,350 A | 12/1995 | Mehta | |
| 5,564,714 A | 10/1996 | Katsuno et al. | |
| 5,582,522 A | 12/1996 | Johnson | |
| 5,605,466 A | 2/1997 | Devlin et al. | |
| 5,641,310 A | 6/1997 | Tiberio, Jr. | |
| 5,662,500 A | 9/1997 | Yeah | |
| 5,680,926 A | 10/1997 | Sandor | |
| 5,741,149 A | 4/1998 | Anthony | |
| 5,785,551 A | 7/1998 | Libby | |
| 5,816,733 A | 10/1998 | Ishikawa | |
| 5,839,594 A | 11/1998 | Barbour | |
| D405,761 S | 2/1999 | Yu | |
| 5,865,633 A | 2/1999 | Hou | |
| D411,170 S | 6/1999 | Deutsch | |
| 5,964,618 A | 10/1999 | McCarthy | |
| 5,965,844 A | 10/1999 | Lippa | |
| 5,975,938 A | 11/1999 | Libby | |
| 6,028,268 A | 2/2000 | Stark et al. | |
| 6,045,374 A | 4/2000 | Candeloro | |
| 6,071,132 A | 6/2000 | Cook | |
| D430,539 S | 9/2000 | Leopold et al. | |
| 6,154,774 A | 11/2000 | Furlong et al. | |
| D434,726 S | 12/2000 | Middlehurst | |
| D434,729 S | 12/2000 | Hwang | |
| 6,156,971 A | 12/2000 | May | |
| 6,171,129 B1 | 1/2001 | Phillips | |
| 6,203,349 B1 | 3/2001 | Nakazawa | |
| 6,287,152 B1 | 9/2001 | Yang | |
| 6,309,248 B1 * | 10/2001 | King | 439/535 |
| 6,319,016 B1 | 11/2001 | Juntwait | |
| 6,328,581 B1 | 12/2001 | Lee et al. | |
| 6,341,981 B1 | 1/2002 | Gorman | |
| 6,376,770 B1 | 4/2002 | Hyde | |
| 6,417,450 B1 | 7/2002 | Young | |
| 6,428,339 B1 | 8/2002 | Davidson et al. | |
| 6,457,988 B1 | 10/2002 | Andersen | |
| 6,494,728 B1 | 12/2002 | Gorman | |
| 6,515,564 B2 | 2/2003 | Leopold et al. | |
| 6,544,049 B1 | 4/2003 | Pierson, Jr. | |
| 6,558,190 B1 | 5/2003 | Pierson, Jr. | |
| 6,563,049 B2 | 5/2003 | May | |
| 6,617,511 B2 | 9/2003 | Schultz et al. | |
| 6,669,495 B2 | 12/2003 | Philips et al. | |
| 6,739,900 B2 | 5/2004 | Mortun et al. | |
| 6,767,245 B2 | 7/2004 | King | |
| 6,817,873 B1 | 11/2004 | Gorman | |
| 6,829,124 B2 | 12/2004 | Leopold et al. | |
| 6,843,680 B2 | 1/2005 | Gorman | |
| 6,857,903 B2 | 2/2005 | Hyde | |
| 6,863,561 B2 | 3/2005 | Gorman | |
| 6,870,099 B1 | 3/2005 | Schultz et al. | |
| 6,876,888 B2 | 4/2005 | Locke | |
| 6,884,111 B2 | 4/2005 | Gorman | |
| 6,894,221 B2 | 5/2005 | Gorman | |
| 6,979,212 B1 | 12/2005 | Gorman | |

| | | |
|---|---|---|
| 6,986,674 B1 | 1/2006 | Gorman |
| 6,994,585 B2 * | 2/2006 | Benoit et al. .................... 174/58 |
| 7,031,602 B2 | 4/2006 | Faries, Jr. et al. |
| 7,052,313 B2 | 5/2006 | Gorman |
| 7,058,525 B2 | 6/2006 | Bertness et al. |
| 7,060,897 B2 | 6/2006 | Gorman |
| 7,081,009 B2 | 7/2006 | Gorman |
| 7,081,010 B2 | 7/2006 | Gorman |
| 7,104,836 B1 | 9/2006 | Gorman |
| 7,175,463 B2 | 2/2007 | Burton |
| 7,189,110 B1 * | 3/2007 | Savicki, Jr. .................... 174/58 |
| 7,265,291 B1 | 9/2007 | Gorman |
| 7,357,652 B1 * | 4/2008 | Arenas et al. ................. 439/107 |
| 7,367,121 B1 | 5/2008 | Gorman |
| 7,537,472 B1 | 5/2009 | Schwarz et al. |
| 7,705,239 B2 * | 4/2010 | Gates et al. .................... 174/50 |
| 7,754,967 B2 * | 7/2010 | Kruse et al. .................... 174/53 |
| 7,780,619 B2 | 8/2010 | Brugger et al. |
| 2002/0055301 A1 | 5/2002 | Gorman |
| 2002/0064983 A1 | 5/2002 | Patey |

FOREIGN PATENT DOCUMENTS

JP 10-321328 12/1998

OTHER PUBLICATIONS

U.S. Reexamination Proceeding U.S. Appl. No. 95/000,253—Right of Appeal Notice.
U.S. Reexamination Proceeding U.S. Appl. No. 95/000,258—Examiner's Action Closing Prosecution (nonfinal).

* cited by examiner

ELECTRICAL WIRING SYSTEM

CROSS REFERENCE TO RELATED APPLICATIONS

This application is a Continuation of U.S. patent application Ser. No. 11/385,346 filed on Mar. 20, 2006, which is a Continuation of U.S. patent application Ser. No. 10/913,084 filed on Aug. 6, 2004, which is a Divisional of U.S. Pat. No. 6,774,307, filed May 7, 2002 and issued on Aug. 10, 2004. The disclosure of the above applications are incorporated herein by reference.

FIELD OF INVENTION

The invention relates generally to electrical outlet systems.

BACKGROUND OF THE INVENTION

Efforts are continuously being made to simplify electrical systems or networks, and the components used in these networks which represent a substantial percentage of the labor and material in commercial and residential construction.

Presently, when it is desired to locate electrical outlets and/or electrical control modules such as switches, rheostats, or any other similar electrical control module that monitors or controls the flow of electricity, on opposite sides of a common wall or partition, an electrician typically installs separate electrical boxes facing in opposite directions. Electrical outlets are sometimes referred to as electrical sockets or receptacles, but will be referred to as electrical outlets herein. Additionally, each electrical box is typically installed on wall structural supports, e.g. wall studs. This procedure is time consuming and involves using extra electrical wire, boxes, standoffs, conduit and other components used during installation of an electrical wiring network, or system. Further, the electrician must avoid cavities in the walls that will not accommodate two electrical boxes in a certain area of the wall or partition. For example, electrical boxes cannot be installed between studs that define a cold air return space.

Additionally, electrical outlets and control modules are typically installed by attaching wires to screws appending from the sides of the outlet or the sides of the control module. These screws can present a safety hazard when they are connected within a live electrical wiring network, e.g. having live electrical current flowing through the network, and come into contact with a conductive surface, such as a metal electrical box or metal wall stud. Also, if the electrical outlet or control module is connected to a live wiring network, a person could be severely shocked upon contacting the screws. Furthermore, the screws can cause accidental injuries to the hands of the person installing the outlet or the control module if a screwdriver that is used to tighten the screws slips off one of the screws.

Through-way electrical boxes have been developed in an attempt to reduce the additional labor and material costs incurred in the installation of electrical wiring networks. However, known through-wall boxes do not allow for using one cavity in a wall to install electrical outlets and/or control modules on opposing sides of the wall without subjecting the electrician, or person installing the outlets and/or control modules, to time consuming mechanical detail work. Some known through-wall boxes require numerous components and fittings which must be adjusted during the installation process, while other known through-wall boxes are not suitable for installing multiple electrical outlets and/or control modules on each side of the wall.

Additionally, plaster ring plates that cover existing electrical boxes, also referred to herein as frames, typically include an aperture for receiving the electrical outlet and/or control module that is centered in the frame. This placement of the aperture does not permit the most efficient use of space within the electrical box nor ease of electrical outlet and/or control module installation in a back-to-back installation.

Furthermore, at least some electrical codes require the electrician to install pigtails on each outlet and control module, which are then connected to the incoming power source, e.g. the electrical wiring network, with electric wire nuts. The installation of pigtails is labor intensive and increases the material costs of installing outlets and control modules.

Thus, it would be desirable to develop a system that provides access to an electrical wiring network from opposing sides of a wall. More specifically, it would be desirable to provide a through-wall electrical system that overcomes the shortcoming of known through-wall systems, thereby reducing labor and material costs of installing such systems. For example, it would be desirable to provide a through-wall electrical system that reduces the complicity of installation caused by numerous components and fittings that must be adjusted during the installation process. Thus, the system should be suitable for installing multiple electrical outlets and/or control modules on each side of the wall, and should also reduce the risks associated with connecting the outlets and/or control modules to the wiring network via screws appending from the outlets and control modules. Additionally, the system should also satisfy code requirements to connect pigtails to the outlet and/or control module prior to connecting the module.

BRIEF SUMMARY OF THE INVENTION

In various embodiments of the present invention, an electrical wiring system is provided for use in an AC electrical power distribution circuit including a plurality of AC electric power transmitting wires configured to be disposed between an AC power distribution point and a device box, wherein the device box includes a wiring ingress aperture and an open front face for accessing an interior of the device box. The plurality of AC electric power transmitting wires are routed through the wiring ingress aperture and extend into the interior of the device box. The system includes a plug connector device configured to terminate the plurality of AC electric power transmitting wires accessible via the open front face of the device box using a termination arrangement. The plug connector device and the termination arrangement are arranged in a detached relationship relative to the device box after termination. The system additionally includes an electrical wiring device configured to be mountable to the open front face of the device box and includes at least one AC electric circuit element disposed in a device housing having a front cover joined to a rear body member. The electrical wiring device further includes at least one electrical interface operatively coupled to the at least one circuit element and configured to direct AC electric power to an electrical load. The electrical wiring device also includes a receptacle disposed in the body member, wherein the receptacle is configured to receive the plug connector device such that electrical continuity is established between the at least one AC electric circuit element and the plurality of AC electric power transmitting wires when the plug connector device is inserted into the receptacle.

In other embodiments of the present invention, a method is provided for installing an electrical wiring system in an AC electrical power distribution circuit including a plurality of AC electric power transmitting wires configured to be disposed between an AC power distribution point and a device box. The device box includes a wiring ingress aperture and an open front face for accessing an interior of the device box, and the plurality of AC electric power transmitting wires are routed through the wiring ingress aperture and extend into the interior of the device box. The method includes terminating the plurality of AC electric power transmitting wires, accessible via the open front face of the device box, with a plug connector, wherein the plug connector terminates the plurality of AC electric power transmitting wires using a termination arrangement. The plug connector device and the termination arrangement are arranged in a detached relationship relative to the device box after termination. The method additionally includes providing an electrical wiring device including at least one AC electric circuit element disposed in a device housing that includes a front cover joined to a rear body member. The electrical wiring device further including at least one electrical interface operatively coupled to the at least one AC electric circuit element and configured to direct AC electric power to an external electrical load, and the electrical wiring device also includes a receptacle disposed in the rear body member. Furthermore, the method includes inserting the plug connector into the receptacle to thereby establish electrical continuity therebetween.

In yet other embodiments of the present invention, an electrical wiring is provided. The system includes an electrical wiring device that includes at least one AC electric circuit element disposed within a device housing, and at least one electrical interface operatively coupled to at least one circuit element and configured to direct AC electric power to an electrical load. The electrical wiring device also includes a predefined area in which a first plurality of electrical contacts are positioned. The system additionally includes a connector device configured to be positioned in contacting relation with the electrical wiring device. The connector device includes a plurality of termination elements configured to terminate a plurality of AC electric power transmitting wires extending through a wiring ingress aperture of a device box and accessible via an open front face of the device box. The termination elements and the connector device are arranged in a detached relationship relative to the device box after termination. The connector device additionally includes a second plurality of electrical contacts disposed in the connector device and electrically coupled to the plurality of termination elements. The second plurality of electrical contacts are configured to be placed in electrical contact with the first plurality of electrical contacts when the connector device is coupled in contacting relation with the electrical wiring device.

BRIEF DESCRIPTION OF THE DRAWINGS

The present invention will become more fully understood from the detailed description and accompanying drawings, wherein.

DETAILED DESCRIPTION OF THE INVENTION

Figure 1:
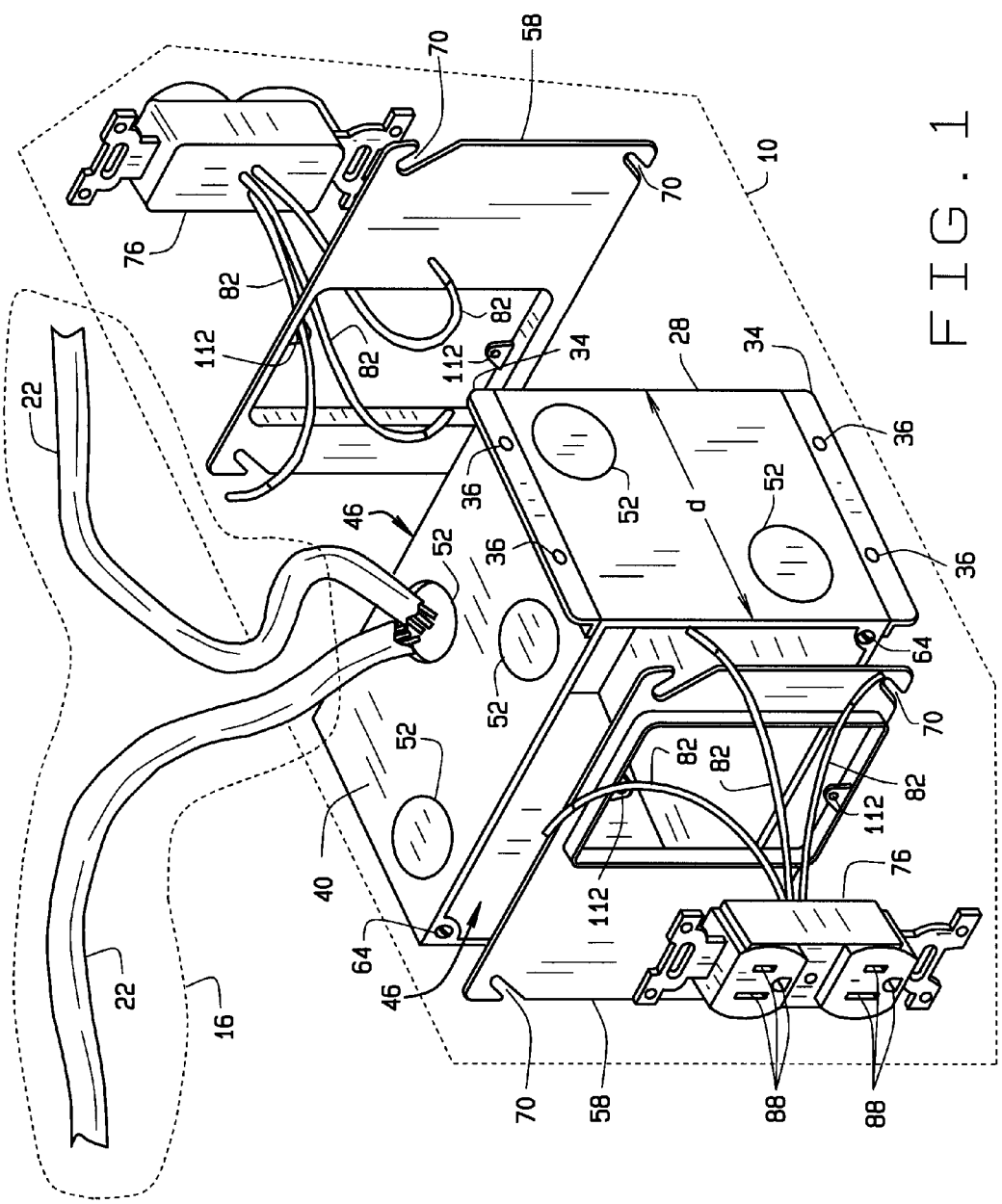
FIG. 1 is a schematic of a system for accessing an electrical wiring network from opposing sides of a common wall, in accordance with a preferred embodiment of the present invention.

FIG. 1 is a schematic of a system 10 for accessing an electrical wiring network 16 from opposing sides of a common wall or partition (not shown), in accordance with a preferred embodiment of the present invention. Wiring network 16, sometimes referred to as an electrical system, is a network of wires installed in a building or other structure that provide and distribute electrical power throughout the building or structure. Wiring network 16 includes a plurality of network branches 22 which are installed inside the walls or partitions of the building or structure, thereby providing and distributing power throughout the building or structure. As used herein, the term plurality is defined as at least two. Wiring network 16 is typically connected to a load center (not shown), also referred to as a breaker box or fuse box, which is the incoming point for electrical service to a residential or commercial building. However, for smaller buildings or structures other than buildings, wiring network 16 may be a sub-network of a larger wiring network and therefore not directly connected to a breaker box.

It is generally known that walls and partitions are typically constructed of at least one structural support, such as a wall stud, and have a wall or partition surface attached to opposing sides of the structural support. System 10 includes a through-wall electrical box 28 that is mounted to one of the structural supports using mounting devices 34 prior to the wall surface being attached to the structural support. Although electrical box 28 is shown in FIG. 1 as having a rectangular shape, it is envisioned that electrical box 28 could have any suitable shape, such as circular, oval, or square. Mounting devices 34 include mounting apertures 36 for receiving nails, screws, or any other fastening device suitable to mount electrical box 28 to the wall or partition structural support. Electrical box 28 is constructed of any material suitable for use in electrical wiring networks, such as plastic or metal. Although mounting device 34 is shown in FIG. 1 as an L-shaped bracket coupled to electrical box 28, it should not be so limited. Mounting device 34 could be any device, system or apparatus suitable for mounting any type of electrical box or similar device to the structural support of a wall or partition, as is well known by those skilled in the art.

Electrical box 28 includes a perimeter wall 40 and two open sides 46 located at opposing ends of perimeter wall 40 thereby defining a passageway through electrical box 28. In a preferred embodiment, perimeter wall 40 has a depth 'd' approximately equal to the width of the structural support to which it is to be mounted. Therefore, electrical box 28 is constructed such that perimeter wall 40 has a specific predetermined depth 'd' that is based upon the width of the structural support used to construct the wall in which electrical box 28 is to be installed. Additionally, in the preferred embodiment, perimeter wall 40 has a uni-body molded construction or is constructed from a single piece of material joined at opposing ends. In an alternate embodiment, electrical box 28 is constructed such that perimeter wall 40 is adjustable to be adapted to walls of various thicknesses. In another alternate embodiment, perimeter wall 40 is constructed of at least two pieces of material joined end-to-end. In yet another embodiment, electrical box 28 is constructed such that perimeter wall 40 has a depth 'd' approximately equal to the width of the structural support plus twice the thickness of the wall surface that is to be attached to both sides of the structural support.

Thus, perimeter wall 40 would have a depth 'd' that extends past both outer edges of the structural support a distance approximately equal to the thickness of the wall surface.

Additionally, electrical box 28 includes at least one wiring aperture 52 that allows at least one network branch 22 to pass therethrough. Wiring aperture 52 is shown in FIG. 1 as a wiring aperture commonly known in the art as a knockout, but should not be so limited. Wiring aperture 52 could be any suitable aperture in electrical box 28 configured to allow at least one network branch 22 to pass therethrough. For example, wiring aperture 52 could be an aperture in electrical box 28 fashioned to provide a strain relief feature that allows network branch 22 pass therethrough, but inhibits network branch 22 from being easily retracted from wiring aperture 52. Although FIG. 1 shows wiring network 16 and network branches 22 free from an enclosure, such as electrical conduit, it is envisioned that wiring network 16 may include a plurality of interconnectable enclosure sections, for example electrical conduits. The interconnectable enclosure sections enclose network branches 22, are connected to the structure, and coupled at one end to electrical box 28 utilizing a wiring aperture 52. Therefore, it is to be understood that wiring aperture 52 may be formed in perimeter wall 40 in any known manner for accommodating one or more enclosure sections that enclose and provide protection for network branches 22.

System 10 further includes a pair of frames 58 that are coupled to electrical box 28 at open sides 46 prior to the wall covering being coupled to the structural support. Frames 58 are sometimes referred to in the art as plaster rings or plaster frames, and are constructed of any material suitable for use in electrical wiring networks, such as plastic or metal. In the preferred embodiment, frames 58 are coupled to electrical box 28 using a plurality of screws 64 inserted through a plurality of frame slots 70. Alternatively, frames 58 are coupled to electrical box 28 in any other suitable manner. For example, frames 58 could include apertures through which screws 64 would be inserted, or screws 64 could be replaced with any other type of suitable connector such as, rivets or nylon press-in snap retainers. Further yet, frames 58 could be hingedly connected at one side of perimeter wall 40 and coupled to perimeter wall 40 at the opposing side using any type of connector such as screws, rivets, a latch, or nylon press-in snap retainers. Frames 58 are further described below in reference to FIG. 2.

In the preferred embodiment, system 10 includes at least one electrical outlet 76 that includes a plurality of integral leads 82. Again, plurality as used herein means at least two. At least one lead 82 is connected to a network branch 22 thereby providing electrical power to the respective electrical outlet 76, that is coupled to one frame 58. Electrical outlet 76 provides a source of, or connection point to, electricity flowing through electrical network 16. A person accesses the electricity by inserting a suitable plug adapter connected to any device that utilizes electricity (not shown), into mating electrical receptor holes 88 in electrical outlet 76. Electrical outlet 76 is sometimes known in the art as an electrical socket, or an electrical receptacle, but will be referred to herein as an electrical outlet. Electrical outlet 76 is further described below in reference to FIG. 3.

Figure 2:
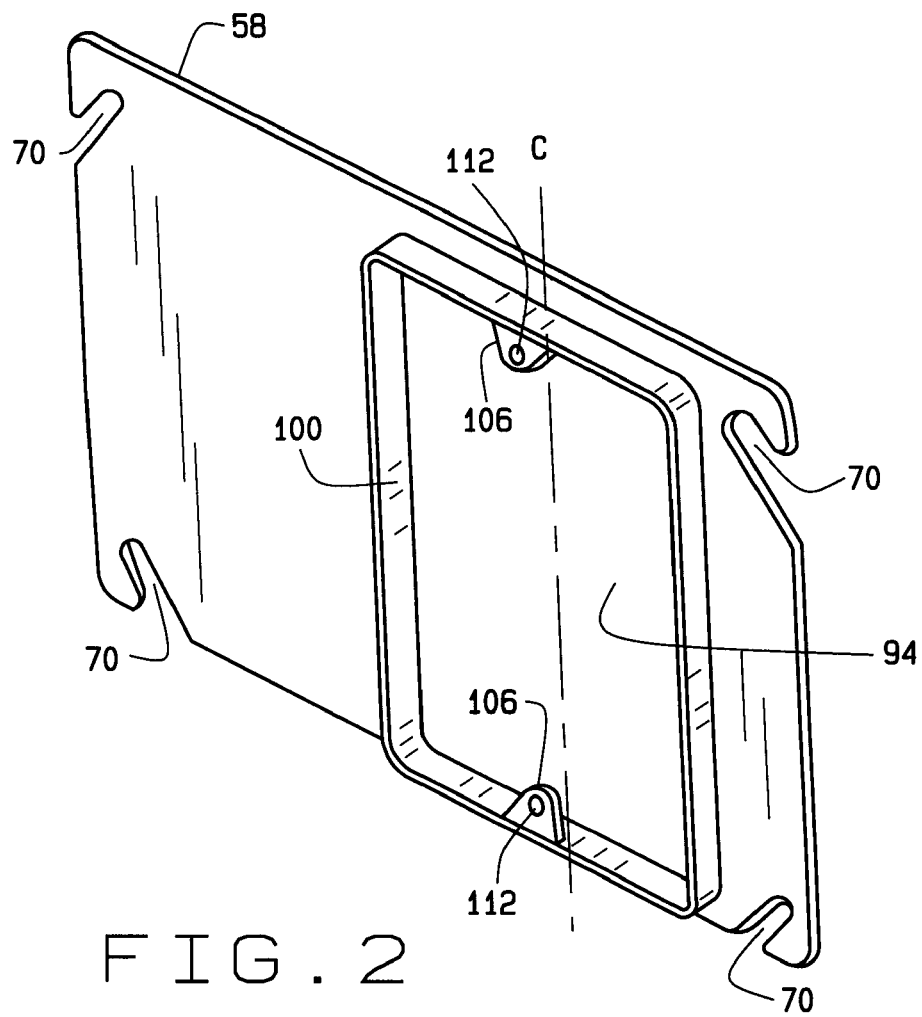
FIG. 2 is a perspective view of a frame used in the system shown in FIG. 1.

FIG. 2 is a perspective view of one of the frames 58 shown in FIG. 1. As described above, frames 58 couple to electrical box 28 (shown in FIG. 1) at open sides 46 (shown in FIG. 1) prior to the wall surface being coupled to the structural supports. Although frame 58 is shown in FIG. 2 having a rectangular shape it should not be so limited. It is envisioned that frame 58 could have any suitable shape, such as circular, oval, or square. Each frame 58 includes a frame aperture 94 that is located off-center in frame 58, such that a centerline 'C' of aperture 94 is substantially closer to one edge of frame 58 than the opposing edge of frame 58. Aperture 94 receives electrical outlet 76 (shown in FIG. 1) when outlet 76 is coupled to frame 58. In an alternate embodiment, aperture 94 of at least one frame 58 receives at least two electrical outlets 76. Although aperture 94 is shown in FIG. 2 having a rectangular shape, it is envisioned that aperture 94 could have any suitable shape, such as circular, oval, or square, and could have dimensions larger or smaller with respect to the overall size of frame 58 than is shown in FIG. 2. In the preferred embodiment, aperture 94 includes a raised lip 100 extending along the perimeter of aperture 94 that has a predetermined height approximately equal to a thickness of the wall surface to be coupled to the structural support on which outlet box 28 is mounted. Raised lip 100 includes a plurality of tabs 106 that include threaded tab holes 112. Outlet 76 is mounted within aperture 94 by coupling outlet 76 to tabs 106. In an alternative embodiment, aperture 94 includes at least two raised lips 100 located at separate points along the perimeter of aperture 94, and each lip 100 includes at least one tab 106 that includes at least one threaded hole 112.

Figure 3:
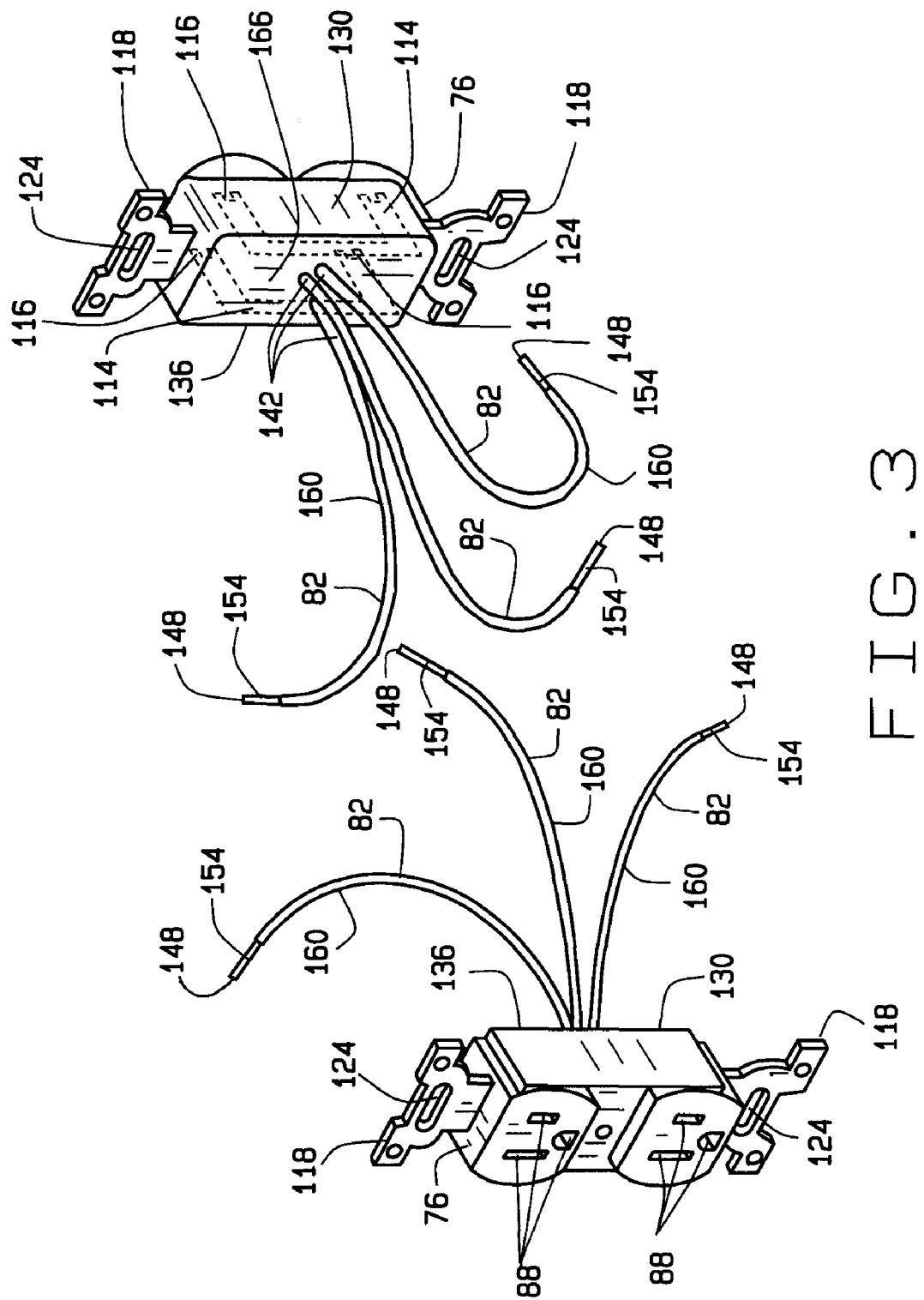
FIG. 3 is a perspective view of an electrical outlet used in the system shown in FIG. 1.

FIG. 3 is a perspective front and back view of electrical outlet 76 used in the system 10 (shown in FIG. 1). As described above, outlet 76 includes a plurality of integral leads 82 wherein at least one lead 82 is connected to wiring network 16 (shown in FIG. 1). Additionally, outlet 76 includes an internal conductive electrical receptor structure 114 having a plurality of receptors 116 configured to receive the plug adapter when the plug adapter is inserted through mating electrical receptor holes 88. Integral leads 82 are connected to electrical receptor structure 114 such that when outlet 76 is connected to wiring network 16, via leads 82, electrical current is provided at outlet 76 accessible via electrical receptor holes 88. Furthermore, each electrical outlet 76 includes at least one outlet mounting bracket 118 that includes at least one mounting hole 124. In the preferred embodiment, outlet 76 is coupled to frame 58 (shown in FIG. 1) by inserting a screw through outlet mounting bracket hole 124 and threading the screw into tab hole 112 (shown in FIG. 1). Alternatively, outlet 76 can be mounted to one of frames 58 by inserting a rivet or nylon press-in snap retainer through bracket hole 124 and into tab hole 112, or by any other suitable means.

Electrical outlet 76 further includes an outlet housing 130 constructed of a non-conductive material, such as plastic or rubber. In addition to being constructed of a non-conductive material, outlet housing 130 has a comprehensively non-conductive outer surface 136 free from conductive appendages or surfaces that are electrically active, or live, when outlet 76 is connected to wiring network 16. Known electrical outlets do not include leads 82, but instead typically include metal screw posts appending from the outlet housing to which a wiring network is connected either directly or via pigtails connected to the metal screw posts. In the present invention, the entire outer surface 136 of each outlet housing 130 is free from any actively conductive appendages or surfaces, such as metal screw posts, or any other actively conductive metal appending from, protruding from, attached to, or otherwise exposed via an aperture in outlet housing 130 that would be in contact with or connected to wiring network 16.

As used herein 'actively conductive' appendage or surface is defined to mean any appendage or surface that is designed to have live current flowing through it once outlet 76 is connected to wiring network 16 as described herein. Therefore, when wiring network 16 is connected to an outlet 76, outlet housing outer surface 136 can be contacted by a person, or come into contact with a conductive surface, such as an outlet box 40 constructed of metal, without the risk of electrical shock or shorting. It is envisioned that housing 130 is of two part construction comprising a first part having receptor holes 88 and a second part from which leads 82 extend.

Each lead 82 includes a proximal end 142, a distal end 148, a wire 154, and an insulating layer 160 covering wire 154. Insulating layer 160 is constructed of any electrically insulating material, such as plastic or rubber. In the preferred embodiment, at least one lead 82 has a predetermined length of insulating layer 160 pre-stripped from distal end 148 thereby exposing a predetermined length of wire 154. Outlet 76 is thereby connected to wiring network 16 by connecting the pre-stripped end of at least one lead to a network branch 22. In an alternate embodiment, insulating layer 160 covers wire 154 from proximal end 142 to distal end 148, and outlet 76 is connected to wiring network 16 by stripping a desired length of insulating layer 160 from at least one lead 82, thereby exposing a desired length of wire 154, then connecting the exposed length of wire 154 to a network branch 22.

In the preferred embodiment, proximal end 142 of each lead 82 extends through outlet housing 130 and is connected to actively conductive electrical receptor structure 114 inside outlet 76 such that each lead 82 is integrally formed, or assembled, with outlet 76. Proximal ends 142 are connected to receptor structure 114 inside outlet 76 using any suitable means such as soldering ends 142 to receptor structure 114, or using a crimping type connection, or using any type of suitable connector assembly, e.g. a jack, a plug, or a strain relief. Therefore, leads 82 are integrally formed or assembled with outlet 76.

Furthermore, in the preferred embodiment, leads 82 extend from a back side 166 of outlet housing 130. Alternatively, leads 82 can extend from any other side of outlet housing 130. It is envisioned that outlet 76 is suitable for use as part of system 10, as described above, and also suitable for use as a stand-alone electrical outlet for use in conjunction with other known types and configurations of outlet boxes. Additionally, in the preferred embodiment, leads 82 all extend individually from housing 130. In another alternate embodiment, leads 82 are bundled together inside a non-conductive casing and only a predetermined length of each distal end 148 extends past a distal end of the non-conductive casing.

Figure 4:
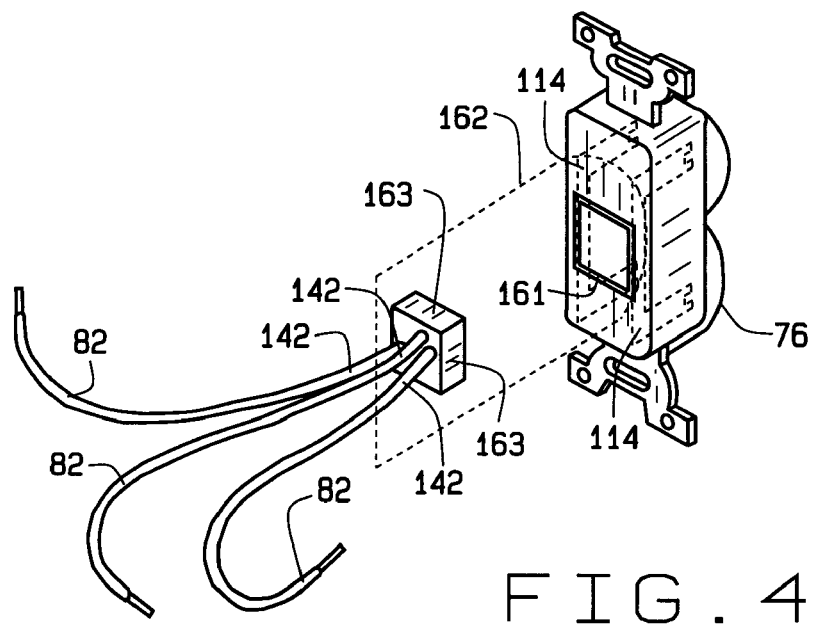
FIG. 4 is a perspective view of an alternate embodiment of the electrical outlet shown in FIG. 3.

FIG. 4 is an alternate embodiment of outlet 76 wherein outlet 76 includes a first connector 161 of a connector module 162. First connector 161 is connected to receptor structure 114. Additionally, the proximal ends 142 of each lead 82 are connected to a mating second connector 163 of connector module 162, thereby forming a subassembly that can be coupled with and decoupled from first connector 161. Therefore, the subassembly can be connected to network branch 22, and outlet 76 can subsequently be connected to network branch 22 by coupling the subassembly second connector 163 with mating first connector 161 of outlet 76. Connector module 162 can be any suitable electrical connection assembly such as a pronged plug assembly or any suitable modular electrical connection device.

Figure 5:
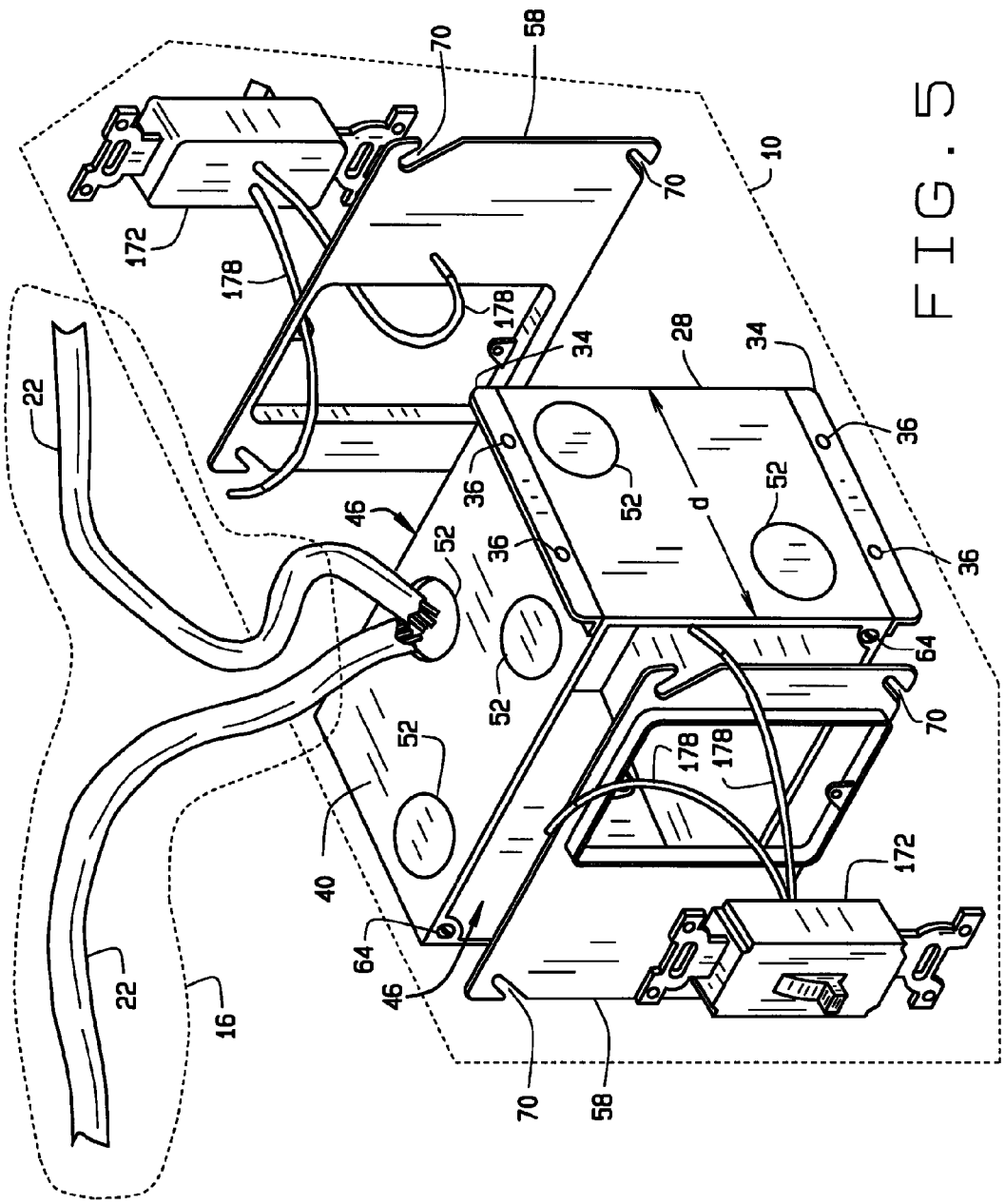
FIG. 5 is a schematic of an alternate embodiment of the system shown in FIG. 1 including a plurality of electrical control modules.

FIG. 5 is an alternate embodiment of system 10 including a plurality of electrical control modules 172. Control modules 172 include a plurality of integral leads 178 that are integrally formed or assembled with control module 172 in the same manner and fashion as lead 82 (shown in FIG. 3) are integrally formed with outlet 76 (shown in FIG. 3). Additionally, integral leads 178 connect to a network branch 22 in the same manner and fashion as leads 82. Control modules 172 are any electrical control module, such as switches or rheostats that monitor and/or control the flow of electricity. Additionally, control modules 172 connect to frames 58 in the same manner and fashion as electrical outlets 76 (shown in FIG. 1). In yet another alternate embodiment, system 10 includes any combination of at least one electrical outlet 76 and at least one control module 172.

Although system 10 has been described in conjunction with a commercial or residential electrical supply network, it is envisioned that system 10 could be utilized in conjunction with other networks that are utilized for the transmission of mediums other than electricity, such a light or sound. For example, system 10 could be implemented in conjunction with a fiber optic network, or a low voltage communications network, e.g. telephone network, or a coaxial communication network, e.g. a cable television network, or a satellite communication network, or an audio network, e.g. an audio entertainment network or public address network. In which case outlets 76 and control modules 172 would be outlets and control modules associated with such networks.

While the invention has been described in terms of various specific embodiments, those skilled in the art will recognize that the invention can be practiced with modification within the spirit and scope of the claims.

What is claimed is:

1. An electrical wiring system for use in an AC electrical power distribution circuit including a plurality of AC electric power transmitting wires configured to be disposed between an AC power distribution point and a device box, the device box including a wiring ingress aperture and an open front face for accessing an interior of the device box, the plurality of AC electric power transmitting wires being routed through the wiring ingress aperture and extending into the interior of the device box, the system comprising:

a plug connector device coupled to a first end of a plurality of leads, the plurality of leads having a second end for directly connecting to the plurality of AC electrical power transmitting wires extending into the interior of the device box, the second ends of the plurality of leads including a first stripped portion, the plurality of AC electrical power transmitting wires including a second stripped portion for engaging one of the first stripped portions; and an electrical wiring device configured to be mountable to the open front face of the device box and including at least one AC electric circuit element disposed in a device housing having a front cover joined to a rear body member, the electrical wiring device further including at least one electrical interface operatively coupled to the at least one AC electric circuit element and configured to direct AC electric power to an electrical load, the electrical wiring device also including a receptacle disposed in the rear body member, the receptacle being configured to receive the plug connector device such that electrical continuity is established between the at least one AC electric circuit element and the plurality of AC electric power transmitting wires when the plug connector device is inserted into the receptacle.

2. The system of claim 1, wherein the plug connector device comprises a female connector device and the receptacle comprises a male connector device.

3. The system of claim 1, wherein the plug connector device comprises a male connector device and the receptacle comprises a female connector device.

4. The system of claim 1, wherein the plurality of AC electric power transmitting wires are disposed in either a cable or conduit that includes a ground wire.

5. The system of claim 1, wherein the at least one electrical interface includes an electrical receptacle configured to accept a power plug coupled to an electrical load.

6. The system of claim 1, wherein the at least one electrical interface includes an electrical switch.

7. An electrical wiring system comprising:
an electrical wiring device including at least one AC electric circuit element disposed within a device housing, the electrical wiring device further including at least one electrical interface operatively coupled to the at least one AC electric circuit element and configured to direct AC electric power to an electrical load, the electrical wiring device also having a predefined area in which a first plurality of electrical contacts are positioned; and
a connector device configured to be positioned in contacting relation with the electrical wiring device, the connector device including:
a plurality of leads, the plurality of leads having first and second ends, the second ends directly connecting to a plurality of AC electric power transmitting wires extending through a wiring ingress aperture of a device box and accessible via an open front face of the device box; and
a second plurality of electrical contacts disposed in said connector device and electrically coupled to said first ends of the plurality of leads, the second plurality of electrical contacts being configured to be placed in electrical contact with said first plurality of electrical contacts when said connector device is coupled in contacting relation with said electrical wiring device;
wherein the second end of the plurality of leads is directly connected to the plurality of AC electrical power transmitting wires without requiring the incorporation of a strain relief.

8. The electrical wiring system according to claim 7, wherein said first plurality of electrical contacts comprises male prong electrical contacts.

9. The electrical wiring system according to claim 7, wherein said second plurality of electrical contacts comprise female prong receptacles.

10. The electrical wiring system according to claim 7, wherein said first plurality of electrical contacts comprise female prong receptacles.

11. The electrical wiring system according to claim 7, wherein said second plurality of electrical contacts comprises male prong electrical contacts.

12. An electrical wiring system comprising:
a plug connector coupled to a first end of a plurality of leads, the plurality of leads having a second end for directly connecting to a plurality of AC electrical power transmitting wires, wherein each of the second ends of the plurality of leads includes a first stripped portion and each of the plurality of AC electrical power transmitting wires includes a second stripped portion for engaging one of the first stripped portions; and
an electrical wiring device sized and configured for connecting to an open front face of a device box, the electrical wiring device including a plurality of electrical receptor structures disposed therein and at least one electrical interface operatively coupled to the electrical receptor structures and configured to direct AC electric power to an electrical load, the electrical wiring device further includes a receptacle disposed in a rear surface thereof, the receptacle being sized and configured to receive the plug connector such that electrical continuity is established between the at least one electrical interface and the AC electric power transmitting wires when the plug connector device is inserted into the receptacle.

13. The system of claim 12, wherein the at least one electrical interface includes an outlet for receiving a power plug.

14. The system of claim 12, wherein the at least one electrical interface includes an electrical switch.

15. An electrical wiring system comprising:
a plug connector coupled to a first end of a plurality of leads, the plurality of leads having a second end for directly connecting to a plurality of AC electrical power transmitting wires; and
an electrical wiring device sized and configured for connecting to an open front face of a device box, the electrical wiring device including a plurality of electrical receptor structures disposed therein and at least one electrical interface operatively coupled to the electrical receptor structures and configured to direct AC electric power to an electrical load, the electrical wiring device further includes a receptacle disposed in a rear surface thereof, the receptacle being sized and configured to receive the plug connector such that electrical continuity is established between the at least one electrical interface and the AC electric power transmitting wires when the plug connector device is inserted into the receptacle;
wherein the second end of the plurality of leads is directly connected to the plurality of AC electrical power transmitting wires without the incorporation of a strain relief.

16. The system of claim 15, wherein the at least one electrical interface includes an outlet for receiving a power plug.

17. The system of claim 15, wherein the at least one electrical interface includes an electrical switch.

* * * * *